United States Patent Office 3,773,763
Patented Nov. 20, 1973

3,773,763
SUBSTITUTED s-TRIAZINE FORMALDEHYDE ADDUCTS
Rodney Lee Wells, Chester, Harry Edwards Ulmer, Hopewell, and Paul James Mason, Chester, Va., assignors to Allied Chemical Corporation, New York, N.Y.
No Drawing. Original application Dec. 10, 1969, Ser. No. 884,000, now Patent No. 3,697,249. Divided and this application May 22, 1972, Ser. No. 255,627
Int. Cl. C07d 55/48
U.S. Cl. 260—249.8                3 Claims

ABSTRACT OF THE DISCLOSURE

Novel 2-alkylamino-4-amino-6-chloro-s-triazine-formaldehyde adducts are prepared by reacting a 2-alkylamino-4-amino-6-chloro-s-triazine with formaldehyde in an inert organic solvent using an alkaline catalyst. Reaction temperatures of 60 to 80° C. for one to three hours are preferred. The reaction mixture may be cooled to separate the product; evaporation of the solvent at advanced temperatures should be avoided as this may cause formation of by-products. The products are highly selective herbicides.

BACKGROUND OF THE INVENTION

This is a division of application Ser. No. 884,000, filed December 10, 1969, now U.S. Pat. No. 3,697,249.

This invention relates to novel 2-4-6 trisubstituted-s-triazines; in particular, it relates to adducts of 2-alkylamino-4-amino-6-chloro-s-triazines and formaldehyde which are useful as herbicides. Over the past few years, a large number of chemical herbicides have been placed on the market, but despite the increasing number of herbicides there remain problems for which none or few herbicides are appropriate. For example, nonselective herbicides are available which when used for postemergence will produce high kills of all vegetation; selective herbicides are available which will attack dicotyledonous or monocotyledonous plants but which also cause a high percent of crop injury. There are very few compounds available which are so selective that they will attack all forms of vegetation with the exception of one crop and accordingly there is a great need in the art for such a herbicide. This need may be shown by the fact that previously, in order to destroy all vegetation except one crop, it was necessary to employ at least two separate herbicides, a method which would make such a procedure economically and commercially impractical.

SUMMARY OF THE INVENTION

The novel adducts of 2-alkylamino-4-amino-6-chloro-s-triazines and formaldehyde of the instant invention are those of the formula

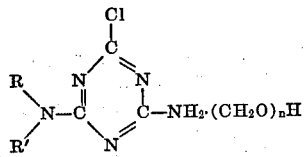

wherein R is alkyl containing up to five carbon atoms, R' is hydrogen or alkyl containing up to five carbon atoms and $n$ is 2.0 to 5.0. These products are highly selective herbicides.

DESCRIPTION OF THE INVENTION

The novel compounds of the present invention are normally prepared by reacting a 2-alkylamino-4-amino-6-chloro-s-triazine with formaldehyde in an inert organic solvent at a temperature of about 60 to 80° C. using an alkaline catalyst. A reaction time of one-half to three hours is normally sufficient. Recovery of the reaction product form the reaction solvent is normally carried out by cooling the reaction mixture to precipitate the product, which is then separated by filtration.

Approximately 2.0 to 5.0 mols of formaldehyde per mol of the triazine compound are used. Reaction-inert solvents which might be used include benzene, toluene, chloroform, and carbon tetrachloride. Alkaline catalysts which may be used include sodium hydroxide, potassium hydroxide, tertiary amines such as triethylamine, and the like. Paraformaldehyde is the usual source of formaldehyde and results in the initial reaction mixture being a slurry.

The 2-alkylamino-4-amino-6-chloro-s-triazines of use in the preparation of the instant products may be synthesized by means taught in the art, for example, Pearlman and Banks, J. Am. Chem. Soc., 70 3726–3728 (1948).

The instant compounds have been found to be unexpectedly effective herbicides in that they are very harmful to plants normally considered undesirable, such as grass and broadleafed weeds, while being harmless toward corn. 2-chloro-4-isopropylamino-6-amino-s-triazine adduct with two mols of formaldehyde is the preferred compound for this purpose. This compound is particularly useful because it will selectively destroy weeds in both corn and oat crops, making possible an initial crop of corn immediately followed by an oat crop.

Normally, the instant compounds will be used as the active ingredient in a herbicidal composition, although they might also be used without a carrier. Various diluents and carriers may be employed and the percent of active ingredient may be varied. Although compositions with less than about 0.25 percent by weight of active ingredient may be used, it is preferable to use compositions containing at least about 5.0 percent of active ingredient because otherwise the amount of carrier becomes excessively large. Activity increases with the concentration of active ingredient, which may be 10, 50, 95 percent or even higher.

The amount of composition which is applied for effective herbicidal action is dependent upon considerations such as the type of undesirable plant to be killed, the density of undesirable plants, and soil and climatic conditions. Usually sufficient composition will be applied to provide about one to ten pounds of active ingredient per acre.

The instant herbicidal compositions may be in the form of a solution, with the solvent being selected from actone, methanol and the like. These solutions can be applied to the plants in a direct manner such as by spraying, sprinkling, drenching, etc. Liquid suspensions can also be applied in this manner, with the dispersant selected from liquids such as water and the like.

Application can also be achieved by dusting a powder in which the active ingredient is dispersed. Suitable carriers include finely powdered material such as clay, fuller's earth and talc.

The instant compounds may constitute the sole active ingredient in the herbicidal compositions, but they might be effectively used in combination with other active ingredients, such as other herbicides and other plant treating agents.

The following examples are provided to more fully illustrate the instant invention. They are provided for illustrative purposes only and are not to be construed as limiting the scope of the invention, which is defined by the appended claims.

EXAMPLE I 2-chloro-4-isopropylamino-6-amino-s-triazine adduct with two mols of formaldehyde Preparation: Forty-seven grams (0.25 mol) of 2-amino-4-chloro-6 - isopropylamino-s-triazine, 16.5 grams paraformaldehyde and 0.15 gram NaOH were mixed in 500 grams of toluene in a one-liter glass reaction vessel fitted with stirrer, thermometer, reflux condenser and means of heating with a steam bath. The mixture was warmed to about 70° C. and gradually became clear. The warm solution was filtered to remove insoluble NaOH and allowed to cool to 25° C. overnight. The cooled filtrate was filtered and the white solids thus obtained were dried under reduced pressure for four hours at 45° C. yielding 38 grams of product which melted at 128 to 131° C. Purified product melted at 131.5 to 132.0° C.

Characterization: The subject compound, 2-chloro-4-isopropylamino-6-amino-s-triazine - formaldehyde adduct ($C_8H_{14}ClN_5O_2=247.7$), was characterized by elemental analysis, infrared spectra, and molecular weight determinations. Elemental analysis was as follows:

|  | Percent | |
| --- | --- | --- |
|  | Calculated | Found |
| Carbon | 38.81 | 39.01 |
| Hydrogen | 5.70 | 5.64 |
| Nitrogen | 28.25 | 29.96 |
| Chlorine | 14.32 | 14.95 |

The molecular weight was found to be 238, compared to the theoretical value of 247.7. The infrared spectra show characteristic peaks which correspond to the postulated structure. Nuclear magnetic resonance spectrum confirmed the proposed structure:

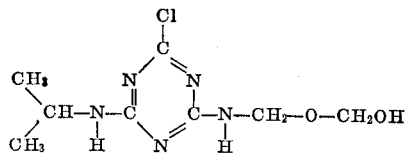

EXAMPLE II

The procedure of Example I is repeated using increased amounts of paraformaldehyde equivalent to 3 to 5 mols of formaldehyde. Products are a mixture of compounds of the general formula:

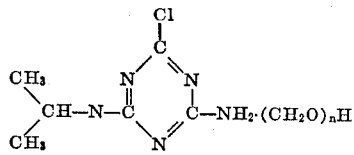

wherein $n$ corresponds to the mols of formaldehyde in the adduct.

EXAMPLE III

The procedure of Example I is repeated using an equivalent amount of appropriate triazine in place of said 2-amino-4-chloro-6-isopropylamino-s-triazine to afford the following products:

2-chloro-4-methylamino-6-amino-s-triazine-formaldehyde adduct
2-chloro-4-n-butylamino-6-amino-s-triazine-formaldehyde adduct
2-chloro-4-isoamylamino-6-amino-s-triazine-formaldehyde adduct
2-chloro-4-dimethylamino-6-amino-s-triazine-formaldehyde adduct
2-chloro-4-diethylamino-6-amino-s-triazine-formaldehyde adduct
2-chloro-4-methylisopropylamino-6-amino-s-triazine-formaldehyde adduct
2-chloro-4-methylethylamino-6-amino-s-triazine-formaldehyde adduct
2-chloro-4-ethyl-n-butylamino-6-amino-s-triazine-formaldehyde adduct
2-chloro-4-ethylisoamylamino-6-amino-s-triazine-formaldehyde adduct

EXAMPLE IV

Herbicidal activity: The following crop species and weed species were planted in metal flats (12 x 8.5 x 4 inches) in greenhouse potting soil containing one-third mixed clay and sand, one-third mushroom soil, and one-third peat moss. The pH of the soil was 6.8 to 7.2.

Crop species:

Corn, *Zea mays*
Cotton, *Gossypium hirsutum*
Sugar beet, *Beta vulgaris*
Soybean, *Glycine max*
Clover, *Trifulium repens*
Oats, *Avena sativum*

Weed species:

Mustard
Crabgrass
Buckwheat
Morning glory
Barnyard grass
Green foxtail

Each flat received a volume of spray equivalent to 50 gallons per acre of an acetone solution of 2-chloro-4-isopropylamino - 6 - amino-s-triazine formaldehyde adduct prepared as in Example I. The concentration of the solution was adjusted to provide application of 1, 2, 4, and 10 pounds of active ingredient per acre. Immediately after spraying, the test flats were placed in aluminum trays and were irrigated until the surface of the soil in the flat was uniformly moist (at field capacity). Additional subirrigation was provided as needed to maintain moisture. No surface irrigation was applied.

The flats were sprayed within one day after seeding in preemergence tests, and 8 to 10 days after seeding in the postemergence tests. Results were observed 14 days after spraying in the postemergence and preemergence tests, respectively.

The effect of the herbicide was evaluated in terms of the injury rating index scale, ranging from 0 to 10 as follows:

0—No visible effect.
1, 2, 3—Slight injury, plant usually recovered with little or no reduction in top growth.
4, 5, 6—Moderate injury, plants usually recovered, but with reduced top growth.
7, 8, 9—Severe injury, plants usually did not recover.
10—All plants killed.

An injury rating of 3 is the maximum tolerated for crops and a rating of 7 is the minimum acceptable on weed plants. Table I shows results of the herbicidal tests on 2-chloro-4-isopropylamino-6-amino-s-triazine adduct of formaldehyde prepared in Example I.

It can be seen from Table I that the herbicidal tests showed the 2-chloro-4-isopropyl-6-amino-s-triazine adduct of formaldehyde to be a very active and selective herbicide. It was noted that with preemergence application, the heribicide appears to be translocated from roots to shoots as the plants emerge. The plants turn chlorotic and eventually die. Corn is resistant to both preemergence and postemergence applications.

TABLE I.—INJURY RATING
2-Chloro-4-Isopropylamino-6-Amino-s-Triazine Adduct with Two Mol of Formaldehyde

| Plant | Preemergence—14 days | | | | Postemergence—14 days | | | |
|---|---|---|---|---|---|---|---|---|
| | (1) | (2) | (3) | (4) | (1) | (2) | (3) | (4) |
| Corn | 0 | 0 | 0 | 3 | 0 | 0 | 0 | 0 |
| Cotton | 5 | 7 | 10 | 10 | 10 | 10 | 10 | 10 |
| Sugar beet | 10 | 10 | 10 | 10 | 10 | 10 | 10 | 10 |
| Soybean | 1 | 2 | 3 | 3 | 10 | 10 | 10 | 10 |
| Clover | 0 | 0 | 0 | 10 | 3 | 4 | 5 | 5 |
| Oats | 1 | 5 | 6 | 7 | 10 | 10 | 10 | 10 |
| Mustard | 10 | 10 | 10 | 10 | 10 | 10 | 10 | 10 |
| Green foxtail | 1 | 9 | 10 | 10 | 3 | 4 | 9 | 10 |
| Crabgrass | 10 | 10 | 10 | 10 | 2 | 6 | 7 | 10 |
| Buckwheat | 10 | 10 | 10 | 10 | 10 | 10 | 10 | 10 |
| Morning glory | 10 | 10 | 10 | 10 | 10 | 10 | 10 | 10 |
| Barnyard grass | 7 | 10 | 10 | 10 | 6 | 8 | 9 | 10 |
| Yellow nut sedge | | | | | | | | |

[1] 1 pound of active ingredient per acre.
[2] 2 pounds of active ingredient per acre.
[3] 4 pounds of active ingredient per acre.
[4] 10 pounds of active ingredient per acre.

What is claimed is:
1. A compound of the formula

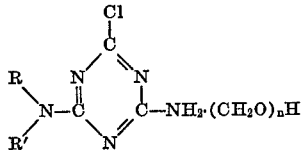

wherein R is alkyl containing up to 5 carbon atoms and R' is a hydrogen or alkyl containing up to 5 carbon atoms and $n$ is 2.0 to 5.0.

2. A compound of claim 1 wherein R' is hydrogen.
3. A compound of claim 1 wherein R is isopropyl and R' is hydrogen.

References Cited
UNITED STATES PATENTS
3,573,301   3/1971   Winter _____ 260—249.8

JOHN M. FORD, Primary Examiner

U.S. Cl. X.R.
71—93